United States Patent
De Sousa et al.

(10) Patent No.: US 9,399,952 B2
(45) Date of Patent: Jul. 26, 2016

(54) METHOD FOR ASSEMBLING A NOZZLE AND AN EXHAUST CASE OF A TURBOMACHINE

(71) Applicant: SNECMA, Paris (FR)

(72) Inventors: Mario Cesar De Sousa, Cesson (FR); Baghdad Achbari, Nangis (FR); Luc Henri Claude Daguenet, Quincy Sous Senart (FR); Benoit Debray, Paris (FR)

(73) Assignee: SNECMA, Paris (FR)

( * ) Notice: Subject to any disclaimer, the term of this patent is extended or adjusted under 35 U.S.C. 154(b) by 376 days.

(21) Appl. No.: 13/974,849

(22) Filed: Aug. 23, 2013

(65) Prior Publication Data

US 2014/0053563 A1 Feb. 27, 2014

(30) Foreign Application Priority Data

Aug. 27, 2012 (FR) .................................... 12 58004

(51) Int. Cl.
| | |
|---|---|
| *F02C 7/20* | (2006.01) |
| *F02K 1/80* | (2006.01) |
| *F01D 9/06* | (2006.01) |
| *F01D 25/16* | (2006.01) |
| *F01D 25/24* | (2006.01) |
| *F01D 25/30* | (2006.01) |
| *F02K 1/48* | (2006.01) |
| *F02K 1/38* | (2006.01) |

(52) U.S. Cl.
CPC . *F02C 7/20* (2013.01); *F01D 9/065* (2013.01); *F01D 25/162* (2013.01); *F01D 25/243* (2013.01); *F01D 25/30* (2013.01); *F02K 1/80* (2013.01); *F02K 1/386* (2013.01); *F02K 1/48* (2013.01); *F05D 2230/60* (2013.01); *Y02T 50/671* (2013.01); *Y10T 29/49321* (2015.01)

(58) Field of Classification Search
CPC ............. F02K 1/48; F02K 1/80; F02K 1/386; F02C 7/20
See application file for complete search history.

(56) References Cited

U.S. PATENT DOCUMENTS

| 3,118,276 | A | | 1/1964 | Keenan et al. |
|---|---|---|---|---|
| 3,273,345 | A | | 9/1966 | Spears, Jr. |
| 3,826,088 | A | * | 7/1974 | Nash ................... C07D 277/587 285/123.1 |
| 5,180,282 | A | * | 1/1993 | Lenhart ................ F01D 25/162 403/287 |
| 6,547,518 | B1 | * | 4/2003 | Czachor ................. F01D 9/044 415/137 |
| 7,677,026 | B2 | * | 3/2010 | Conete ....................... F02K 1/48 181/220 |
| 8,826,669 | B2 | * | 9/2014 | Bouchard ............... F02K 1/827 181/213 |
| 2004/0255573 | A1 | * | 12/2004 | Rago ....................... F02K 1/386 60/262 |
| 2006/0010852 | A1 | * | 1/2006 | Gekht ................ B23K 15/0093 60/262 |

(Continued)

FOREIGN PATENT DOCUMENTS

| EP | 2 003 312 A1 | 12/2008 | |
|---|---|---|---|
| GB | 1009314 A | * 11/1965 | .............. F02K 1/386 |

OTHER PUBLICATIONS

U.S. Appl. No. 14/403,305, filed Nov. 24, 2014, De Sousa, et al.

(Continued)

*Primary Examiner* — William H Rodriguez
*Assistant Examiner* — Eric Linderman
(74) *Attorney, Agent, or Firm* — Oblon, McClelland, Maier & Neustadt, L.L.P.

(57) ABSTRACT

A method for assembling a nozzle and an exhaust case of a turbomachine is disclosed. The exhaust case includes a hub and an outer ferrule connected to each other by a plurality of arms. The nozzle is attached to the outer ferrule of the exhaust case substantially at the trailing edges of the arms.

9 Claims, 4 Drawing Sheets

(56) References Cited

U.S. PATENT DOCUMENTS

| | | | |
|---|---|---|---|
| 2006/0112675 A1 | 6/2006 | Anderson et al. | |
| 2007/0217911 A1* | 9/2007 | Cameriano | F01D 9/065 415/220 |
| 2007/0280819 A1* | 12/2007 | Eleftheriou | F01D 25/162 415/115 |
| 2010/0126183 A1* | 5/2010 | Conete | F02K 1/386 60/796 |
| 2010/0205930 A1* | 8/2010 | Conete | F02K 1/04 60/226.1 |
| 2010/0218505 A1* | 9/2010 | Lains | F02C 7/266 60/765 |
| 2013/0115051 A1* | 5/2013 | Bouchard | F02K 1/827 415/119 |
| 2014/0241863 A1* | 8/2014 | Tardif | F01D 25/24 415/145 |
| 2014/0298772 A1* | 10/2014 | Klingels | F02K 3/075 60/226.3 |
| 2015/0152788 A1* | 6/2015 | De Sousa | F01D 25/24 60/39.5 |

OTHER PUBLICATIONS

French Preliminary Search Report issued May 16, 2013, in French Application No. 12 58004 filed Aug. 27, 2012 (with English Translation of Categories of Cited Documents).

* cited by examiner

METHOD FOR ASSEMBLING A NOZZLE AND AN EXHAUST CASE OF A TURBOMACHINE

TECHNICAL FIELD

The present invention relates to the field of turbomachines, and more particularly to the field of exhaust cases and nozzles equipping turbomachines. It relates to a method for assembling a nozzle and an exhaust case of a turbomachine, an exhaust system including such a nozzle and such an exhaust case, as well as the associated turbomachine.

The invention is applicable to any type of terrestrial or aeronautic turbomachines, and in particular to aircraft turbomachines such as turbojet engines and turboprop engines. More preferentially, the invention can be applied to a twin spool turbofan engine.

STATE OF PRIOR ART

In the field of turbomachines, the nozzle is the variable cross-section duct placed on the exhaust case at the outlet of the combustion chamber for transforming the energy of combustion gases into kinetic energy.

Separate flow nozzles can in particular be mentioned, which generally consist of a confluent flow nacelle enclosing a primary cowl defining a first annular channel for flowing a primary flow (or hot flow) from the combustion chamber and a secondary cowl concentrically provided about the primary cowl so as to define a second annular channel for flowing a secondary flow (or cold flow) from the fan.

On the other hand, in order to reduce the jet noise generated at the outlet of such nozzles, it is known to use mixers tailored to promote mixing between the primary flow and the secondary flow from the turbojet engine. One of the most currently used designs in civil turbojet engines is that of the lobe mixer. Indeed, the lobe mixer affords a radial shear between the primary and secondary flows in order to promote mixing of these flows.

FIGS. 1 and 2 illustrate a known manner according to prior art for attaching a nozzle including a mixer to an exhaust case of a turbomachine.

More precisely, FIG. 1 represents, in a partial and perspective view, a turbomachine 1 including a mixer M assembled to an exhaust case C. FIG. 2 illustrates, in a partial cross-section view, the assembly of the mixer M to the exhaust case C. The mixer M equips a nozzle (not visible). The exhaust case C includes a hub, carrying an annular flange coaxial with the hub H, an outer ferrule 5 and a plurality of arms 6 connecting the hub H and the outer ferrule 5. The mixer M and the exhaust case C include on the other hand, respectively, axial attachment flanges 2 and 3 which enable them to be assembled through bolted joints 4. The attachment flange 3 of the exhaust case C is carried by the outer ferrule 5.

As can be more particularly seen in FIG. 2, the attachment flange 3 of the outer ferrule 5 has been provided downstream of the arm 6 of the exhaust case C, at a distance L, more or less high as a function of the mechanical sizing of the mixer M, with respect to the trailing edges 6a of the arms 6. Furthermore, the attachment flange 3 of the exhaust case C is located, at least for some operating phases of the turbomachine 1, in an area of the turbomachine 1 which is cooler than at the arms 6. Indeed, the attachment flange 3 includes a mass outside the jet, or in the secondary flow (or cold flow), and consequently is cooler and has thermal inertia different from the arms 6. The attachment flange 3 can thus be more rigid and cooler, for some critical operating phases of the turbomachine 1, than the part of the outer ferrule 5 located upstream at the arms 6 of the exhaust case C. The attachment flange 3 thus can counteract the deformation of the outer ferrule 5 by restraining it, which therefore opposes to the expansion of the arms 6 which, particularly in these operating phases, are hotter.

Consequently, this design known in prior art for attaching the mixer M to the exhaust case C results in that the attachment flange 3 "drives" the displacements of the outer ferrule 5 at the arms 6, and thus, by a flexure effect, impacts the deformations at the trailing edges 6a of the arms 6, already subjected to very high heat stresses, which causes overloads in this area with consequently significant restrictions in the lifetime (or service life) of the exhaust case C.

DISCLOSURE OF THE INVENTION

Therefore there is a need to provide a new method for assembling a nozzle to the exhaust case of a turbomachine enabling the lifetime of the exhaust case to be enhanced. There is more particularly a need to provide a solution which is less restrictive in operation for the trailing edges of the arms of the exhaust case.

The object of the invention is to fulfil at least partially the abovementioned needs and to overcome drawbacks relating to arrangements of prior art.

The object of the invention, according to one aspect thereof, is thus to provide a method for assembling a nozzle and an exhaust case of a turbomachine, the exhaust case including a hub and an outer ferrule connected to each other by a plurality of arms,
characterised in that the nozzle is attached to the outer ferrule, in particular to an attachment flange of the outer ferrule, of the exhaust case substantially at the trailing edges of the arms.

By virtue of the invention, since the attachment of the nozzle to the exhaust case is substantially performed at the trailing edges of the arms of the exhaust case, it can be possible to cancel, or at least reduce, the flexure effect brought about by the solution of prior art so as to make the attachment area passive in terms of impact of its expansions and minimize negative consequences on the lifetime of the exhaust case. The displacement of the attachment area upstream, radially leveled with the trailing edges of the arms of the exhaust case, further adds material, which is in favour of decreased pressure stresses enabling the mechanical strength at the trailing edges to be optimized, and the length of the downstream part of the outer ferrule of the exhaust case to be reduced, thus enabling a gain in axial overall space and mass.

In the present application, upstream and downstream are defined with respect to the regular flow direction of the fluid (upstream to downstream) through the turbomachine. On the other hand, the axial direction corresponds to the direction of the rotational axis of the rotor of the turbomachine, and a radial direction is a direction perpendicular to this rotational axis.

The method according to the invention can further include one or more of the following characteristics taken alone or according to any possible technical combinations.

The nozzle can enable flow(s) from a gas turbine of the turbomachine to be channelized. The exhaust case can enable the nozzle to be connected to the outlet of the gas turbine.

In accordance with the invention, the nozzle is attached to the outer ferrule of the exhaust case at the trailing edges of the arms located downstream, close to the nozzle.

By "substantially close to", it is meant that the attachment of the nozzle to the exhaust case is made exactly or approximately at the trailing edges of the arms. In particular, the attachment of the nozzle to the exhaust case is made substantially in the same radial part of the turbomachine as that containing the trailing edges of the arms of the exhaust case. In relation to the rotational axis of the turbomachine, the trailing edges of the arms and the attachment area of the nozzle to the exhaust case are substantially close to each other. The attachment is in particular performed in the vicinity of the trailing edges of the arms. The attachment can in particular be performed superimposed to the trailing edges of the arms of the exhaust case, above the same.

In other words, the nozzle is advantageously attached to the outer ferrule of the exhaust case in the same radial part of the turbomachine as that containing the trailing edges of the arms of the exhaust case.

More specifically, the exhaust case, and in particular the outer ferrule, can include an attachment flange located at the trailing edges of the arms of the exhaust case, in particular above the trailing edges.

The nozzle can include a mixer, wherein the attachment is performed through the mixer.

The outer ferrule of the exhaust case can include an attachment flange, in particular an axial or radial attachment flange.

Furthermore, the nozzle, and in particular the mixer, can include an attachment flange, in particular an axial or radial attachment flange.

The attachment flanges of the outer ferrule and the nozzle can thus be located at the trailing edges of the arms of the exhaust case.

The attachment flanges of the nozzle and the outer ferrule can be cylindrical and of the same axis as the exhaust case.

The attachment of the nozzle to the exhaust case can be performed at least partly through axial and/or radial attachment flanges respectively carried by the nozzle and the outer ferrule of the exhaust case, respectively using axial and/or radial bolted joints. In particular, the attachment of the nozzle to the exhaust case can be performed through only axial or only radial attachment flanges, respectively carried by the nozzle and the outer ferrule of the exhaust case.

The attachment flanges of the outer ferrule of the exhaust case and the nozzle, in particular of the mixer, can be secured together by bolted joints, in particular axial and/or radial bolted joints.

The bolted joints can include, in particular on the exhaust case side, floating rivet nuts allowing for example lining up with screws, in particular on the nozzle side, upon tightening, and/or clinch nuts, in particular to the attachment flange of the exhaust case, to make tightening easier.

Preferably, the attachment of the nozzle and the exhaust case is performed through radial attachment flanges, in particular using radial bolted joints. A radial attachment can in particular enable to have available more space at the yokes for tightening.

The radial attachment flange of the outer ferrule can be a weldably fastened flange to the outer ferrule. The attachment flange of the outer ferrule can for example be a forged flange, and the outer ferrule can for example be cast. The attachment flange of the outer ferrule can be a bent flange so as to allow radial attachment.

The attachment flange of the nozzle can also be a bent flange, obtained in particular through forming or machining.

The exhaust case can include yokes.

The attachment flange of the outer ferrule and/or the attachment flange of the nozzle, and in particular of the mixer, can be scalloped, in particular facing yokes present on the exhaust case.

The attachment flanges of the outer ferrule and the nozzle can be secured together by bolted joints, and a scalloping can be performed between each bolted joint, in particular facing yokes of the exhaust case. In this way, it is for example possible to reduce the total weight of the exhaust case and/or the nozzle.

The object of the invention, according to another of its aspects, is further to provide an exhaust system for a turbomachine including a nozzle and an exhaust case, the exhaust case including a hub and an outer ferrule connected to each other by a plurality of arms, characterised in that the nozzle is attached to the outer ferrule, in particular to an attachment flange of the outer ferrule, of the exhaust case substantially at the trailing edges of the arms.

In other words, the nozzle is advantageously attached to the outer ferrule of the exhaust case in the same radial part of the turbomachine as that containing the trailing edges of the arms of the exhaust case.

The exhaust system according to the invention can be used for channelizing flow(s) from a gas turbine of the turbomachine.

The exhaust system according to the invention can include a nozzle and an exhaust case assembled together by implementing the method in accordance with the invention.

In particular, the nozzle can be attached to the exhaust case at least partly through axial attachment flanges respectively carried by the nozzle and the outer ferrule of the exhaust case. The nozzle can further be attached to the exhaust case at least partly through radial attachment flanges respectively carried by the nozzle and the outer ferrule of the exhaust case.

The object of the invention, according to another of its aspects, is also to provide a turbomachine characterised in that it includes a nozzle and an exhaust case assembled by implementing the method such a defined above or in that it includes an exhaust system such as defined above.

The exhaust system and the turbomachine according to the invention can include any of the characteristics set out previously, taken alone or according to any technical possible combinations with other characteristics.

BRIEF DESCRIPTION OF THE DRAWINGS

The invention could be better understood upon reading the following detailed description, of an exemplary embodiment in no way limiting the same, as well as upon examining the schematic and partial figures, of the appended drawing, wherein.

Throughout these figures, identical references can designate identical or analogous elements.

Furthermore, the different parts represented in the figures are not necessarily at a uniform scale, for the figures to be more intelligible.

DETAILED DISCLOSURE OF A PARTICULAR EMBODIMENT

Throughout the description, by "axial flange", respectively "radial flange", it is intended a flange associated with an axial, respectively radial bolted joint.

It will now be described hereinafter, in reference to FIGS. 3 to 7, an exemplary exhaust system including a nozzle and an exhaust case assembled by implementing the method according to the invention.

In this example, the nozzle includes a mixer M, and the assembly of the nozzle to the exhaust case C includes the assembly of the mixer M to the exhaust case C. On the other hand, the attachment mode represented in a radial attachment mode, through radial attachment flanges, but this choice is in no way limiting. Alternatively, the attachment of the exhaust case C and the mixer M can be made by means of axial attachment flanges.

Figure 1:
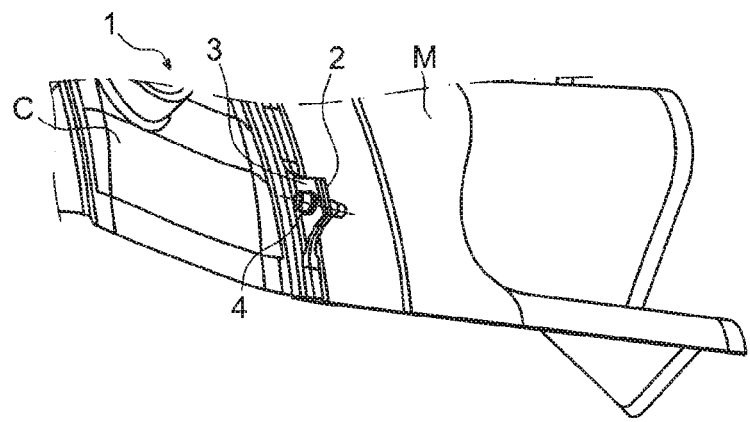
FIG. 1 illustrates, in a partial perspective view, a method according to prior art for assembling a mixer to an exhaust case of a turbomachine
Figure 2:
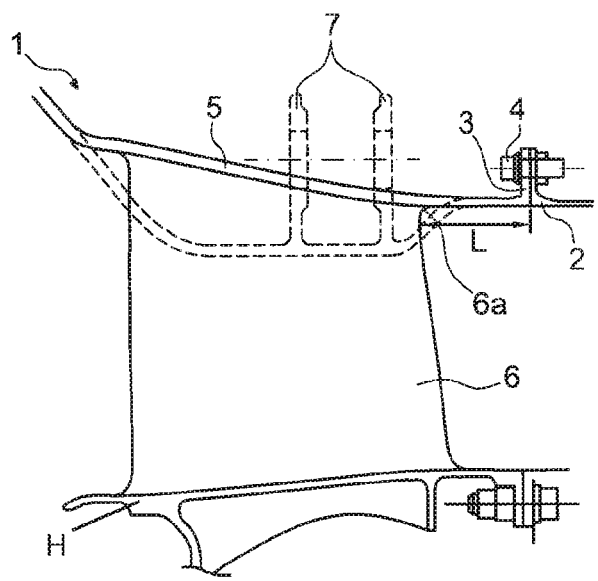
FIG. 2 illustrates, in a partial cross-section view, the assembly of the mixer to the exhaust case according to prior art.
Figure 3:
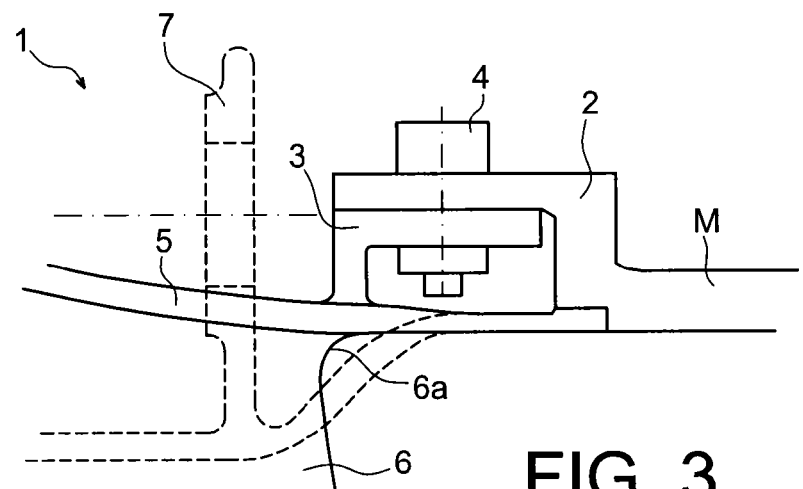
FIG. 3 illustrates, in a partial cross-section view, an exemplary embodiment of an exhaust system including a mixer and an exhaust case assembled by implementing the method according to the invention.
Figure 4:
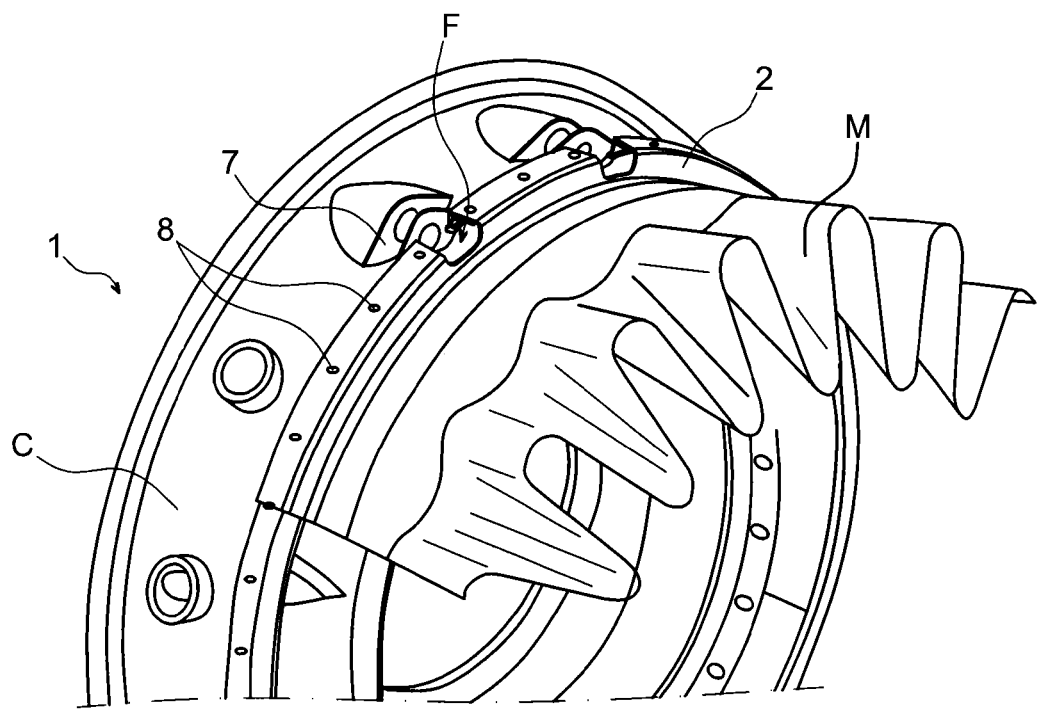
FIGS. 4 to 7 illustrate, in a schematic perspective view, the exemplary embodiment of FIG. 3.
Figure 5:
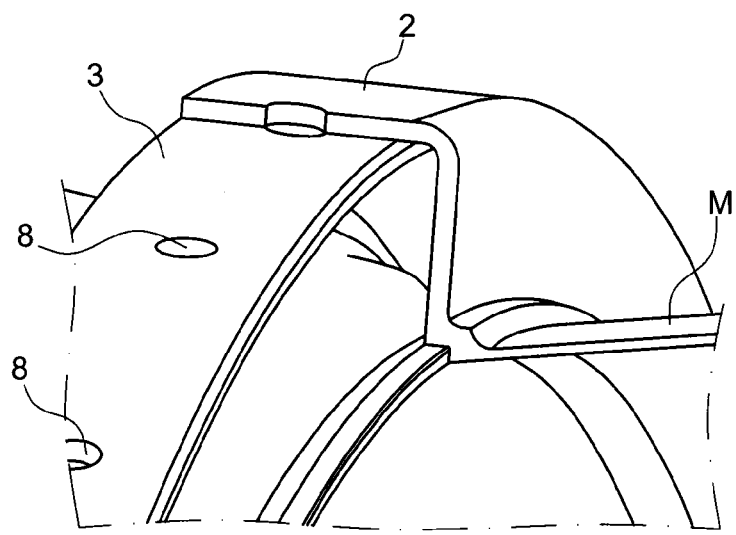
Figure 6:
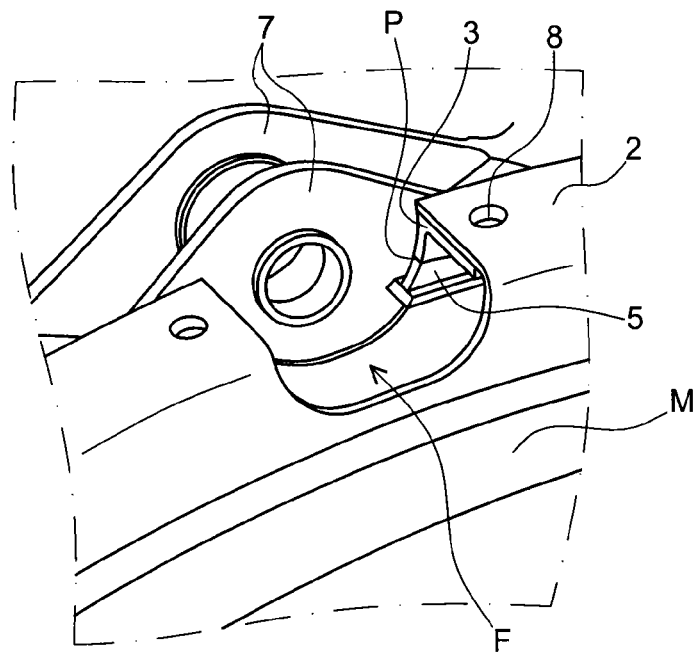

FIG. 3 represents, in a schematic cross-section view, the attachment between the mixer M and the outer ferrule 5 of the exhaust case C according to the method in accordance with the invention. On the other hand, FIGS. 4 to 6 represent different schematic perspective views of the exhaust system of the turbomachine 1 including a mixer M and an exhaust case C assembled according to the exemplary embodiment of FIG. 3.

The mixer M includes a bent attachment flange 2, obtained for example by forming or machining.

Furthermore, the outer ferrule 5 of the exhaust case C includes an attachment flange 3, for example weldably fastened to the outer ferrule 5. The attachment flange 3 can for example be fastened to the outer ferrule 5 along a welding plane P, as represented in FIG. 6.

In accordance with the invention, the attachment of the mixer M to the exhaust case C can be made with the attachment flanges 2 and 3, and is preferentially performed at the trailing edges 6a of the arms 6 of the exhaust case C, as can be seen in FIG. 3. In particular, the bolted joints 4, enabling the attachment flanges 2 and 3 to be secured to each other by passing through ports 8 formed in the attachment flanges 2 and 3, are made in a radial part of the turbomachine 1 containing the trailing edges 6a of the arms 6. The attachment thus substantially occurs superimposed with the trailing edges 6a. The attachment flange 3 of the outer ferrule 5 is in particular located above the trailing edges 6a of the arms 6.

On the other hand, as can be seen in FIGS. 4 and 6, scallopings F can be made to the attachment flanges 2 and 3 facing the yokes 7 of the exhaust case C so as to provide a gap at the yokes 7 to enable machining tools to pass through holes in the yokes, and then wear bushes to be mounted in the yokes 7 which will receive the hinge lines of the swing hangers.

Figure 7:
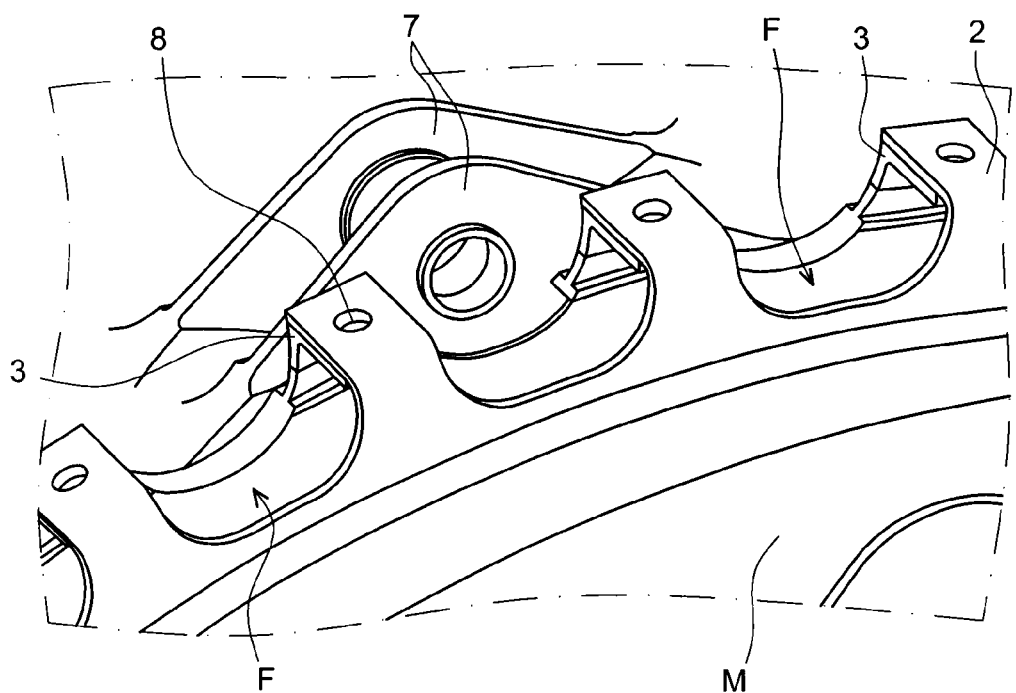

FIG. 7 further illustrates the possible performance of further scallopings F between each port 8 enabling bolted joints 4 to pass therethrough. In this way, it is for example possible to reduce the total mass of the exhaust system.

Advantageously, the attachment of the mixer M and the exhaust case C through the attachment flanges 2 and 3 located at the trailing edges 6a of the arms 6 should significantly promote the optimization of the exhaust case service life, by preventing flexure and hence reducing thermomechanical stresses exerted to the trailing edges 6a of the arms 6, which stresses are highly present in particular according to the solution of prior art which provides for an attachment to a part of the outer ferrule 5 notably more downstream of the trailing edges 6a of the arms 6.

Of course, the invention is not restricted to the exemplary embodiment just described. Various changes can be made thereto by those skilled in the art.

The phrase "including a" should be understood as being synonymous of "including at least one", unless otherwise specified.

The invention claimed is:

1. A method of assembling a nozzle and an exhaust case of a turbomachine, the exhaust case including a hub and an outer ferrule connected to each other by a plurality of arms, the method comprising:
   attaching the nozzle to the outer ferrule of the exhaust case in a same radial part of the turbomachine as that containing trailing edges of the arms of the exhaust case,
   wherein the attaching of the nozzle to the exhaust case is performed at least partly through radial attachment flanges carried by nozzle and the outer ferrule of the exhaust case, respectively, each including ports through which radial bolted joints pass, the ports and the radially bolted joints presenting an axis extending radially,
   wherein the axis of ports and the radially bolted joints is perpendicular to an axis of the turbo machine, and
   wherein an axial location of the trailing edges of the arms overlaps at least one of the radial attachment flanges carried by the nozzle and the outer ferrule of the exhaust case.

2. The method according to claim 1, wherein the attachment of the nozzle to the exhaust case is performed at least partly through axial attachment flanges carried by the nozzle and the outer ferrule of the exhaust case respectively, using axial bolted joints.

3. The method according to claim 1, wherein the nozzle includes a mixer, the attachment being performed through the mixer.

4. The method according to claim 1, wherein at least one of the attachment flange of the outer ferrule or the attachment flange of the nozzle is scalloped.

5. The method according to claim 4, wherein the attachment flanges of the outer ferrule and of the nozzle are secured together by bolted joints, and a scalloping is performed between each bolted joint.

6. An exhaust system of a turbomachine comprising:
   a nozzle; and
   an exhaust case, the exhaust case including a hub and an outer ferrule connected to each other by a plurality of arms,
   wherein the nozzle is attached to the outer ferrule of the exhaust case in a same radial part of the turbomachine as that containing trailing edges of the arms of the exhaust case,
   wherein the nozzle is attached to the exhaust case at least partly through radial attachment flanges carried by the nozzle and the outer ferrule of the exhaust case,
   respectively, each including ports through which radial bolted joints pass, the ports and the radially bolted joints present an axis extending radially,
   wherein an axis of ports and the radially bolted joints is perpendicular to an axis of the turbo machine, and
   wherein an axial location of the trailing edges of the arms overlaps at least one of the radial attachment flanges carried by the nozzle and the outer ferrule of the exhaust case.

7. The exhaust system according to claim 6, wherein the nozzle is attached to the exhaust case at least partly through axial attachment flanges carried by the nozzle and the outer ferrule of the exhaust case respectively, using axial bolted joints.

8. The turbomachine comprising the nozzle and the exhaust case assembled by implementing the method according to claim 1.

9. The turbomachine comprising the exhaust system according to claim 6.

* * * * *